W. MINNICK.
VEHICLE WHEEL.
APPLICATION FILED DEC. 2, 1913.

1,107,093.    Patented Aug. 11, 1914.

Witnesses
J. L. Wright
P. M. Smith

Inventor
William Minnick
By Victor J. Evans
Attorney

UNITED STATES PATENT OFFICE.

WILLIAM MINNICK, OF BARBERTON, OHIO.

VEHICLE-WHEEL.

1,107,093.  Specification of Letters Patent.  Patented Aug. 11, 1914.

Application filed December 2, 1913. Serial No. 804,297.

*To all whom it may concern:*

Be it known that I, WILLIAM MINNICK, a citizen of the United States, residing at Barberton, in the county of Summit and State of Ohio, have invented new and useful Improvements in Vehicle-Wheels, of which the following is a specification.

This invention relates to vehicle wheels, the object in view being to produce a wheel in which the tire is supported by springs and yet rendered flexible and yielding throughout, doing away with the usual pneumatic tire and the troubles incident to the use thereof.

A further object of the invention is to provide a wheel embodying a hub, rim and spokes together with a spring supported sectional tire supporting rim in which all sections of the tire will be sufficiently supported and adapted to yield in accordance with the requirements of the road.

With the above and other objects in view, the invention consists in the construction, combination and arrangement of parts, as will hereinafter be more fully described, illustrated and claimed.

Figure 1:
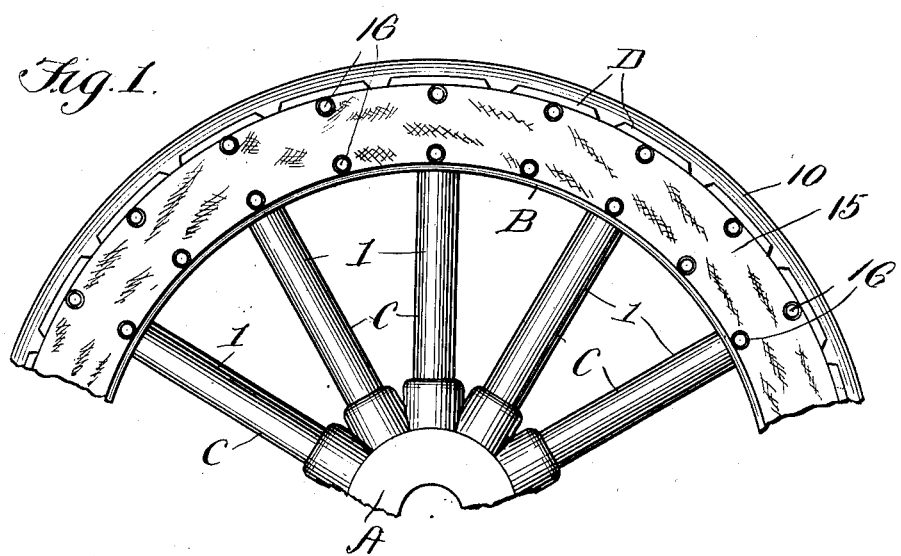
Figure 2:
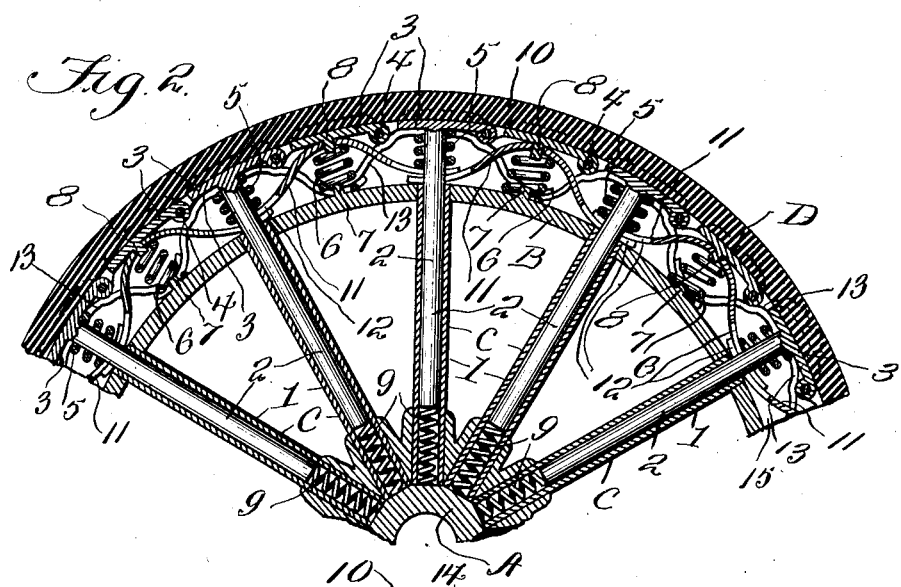
Figure 3:
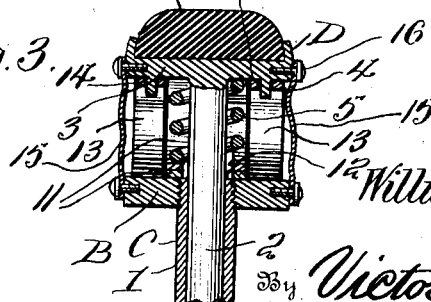

In the accompanying drawings: Figure 1 is a side elevation of a portion of a wheel constructed in accordance with the present invention. Fig. 2 is a sectional view of the same showing the arrangement of supporting springs, sectional spokes and sectional rim. Fig. 3 is a cross section through the same.

Referring to the drawings A designates a wheel hub, B a fixed rim and C spokes interposed between said hub and rim. In carrying out the present invention each of the spokes C consists of two telescopic members, 1 designating a tubular member and 2 another member which may be either tubular or solid in cross section and which is adapted to slide freely within the tubular section 1. The tubular spoke section 1 is rigidly connected at its inner end to the hub A and is also rigidly connected at its outer end to the fixed inner rim B through which the outer extremity of the tubular section 1 of the spoke passes as clearly shown in Fig. 2. The outer sections 2 of the spokes support a sectional outer rim D which is composed of a large number of sections 3 connected together by knuckle joints 4 so that all of the sections may freely flex or yield inwardly. One of the sections 3 is mounted directly on the outer end of one of the spoke sections 2 as clearly shown in Fig. 2 while a coiled expansion spring 5 encircles the section 2 of the spoke and is interposed between the adjacent outer rim section 3 and the fixed inner rim B. This construction is followed out with reference to each of the spokes of the wheel. In order to support the intermediate sections 3, a separate and independent coiled expansion spring 6 is employed, said spring being interposed between the fixed rim B and the adjacent rim section 3. Each of the springs 6 may be held in place by any suitable means, for example, studs 7 and 8 projecting from the adjacent faces of the fixed rim B and the outer rim sections 3. Other coiled expansion springs 9 are located in the inner ends of the tubular spoke sections 1 between the hub A and the inner ends of the spoke sections 2 as shown in Fig. 2, the springs 5 and 9 bearing a complemental relation to each other and serving to mutually support the outer sectional rim yieldingly with respect to the hub of the wheel. A tire 10 of rubber or any suitable material is secured to the outer faces of the outer rim sections 3 and is therefore yieldingly supported by said sections in view of the construction above described and illustrated in the accompanying drawings.

In addition to the coiled springs hereinabove described, I also desire to employ bowed springs 11 arranged in two series side by side as shown in Fig. 3, and crossing each other in the manner illustrated in Fig. 2 at points between the spokes. The springs 11 are provided with slotted ends as shown at 12 to embrace the spoke sections 2 and at suitable points said springs are offset as indicated at 13 to form seats for the connecting knuckles of the felly sections, thereby supporting said felly sections at the joints. The springs 11 are further held in place by means of studs 14 on the inner sides of the felly sections, the springs being formed with holes to receive said studs as clearly shown in Figs. 2 and 3.

15 designates oppositely located flexible bands or strips for housing in and protecting the springs, said strips being secured by suitable fasteners 16 to the rim B and the felly sections. These flexible strips or guards serve to exclude dust, dirt and foreign matter.

What I claim is:—

A vehicle wheel composing a hub, a fixed inner rim, spokes interposed between said hub and rim and each embodying a tubular section fastened at its inner end to the hub and at its outer end to the fixed rim through which it passes, an outer spoke section slidable in said tubular section, an outer tire supporting rim embodying sections having a hinged connection with each other and supported by the outer ends of said spokes, expansion springs encircling said spokes between the inner and outer rims, springs contained within the inner ends of the tubular spoke sections and acting to support the outer spoke sections, coiled expansion springs interposed between the inner and outer rims and located at intervals between said spokes, and bowed springs interposed between the rim and felly sections and arranged in two sets, the springs of one set crossing those of the other set at points between the spokes.

In testimony whereof I affix my signature in presence of two witnesses.

WILLIAM MINNICK.

Witnesses:
RAY E. MORTON,
JOHN F. BAUGHMAN.